United States Patent [19]

Stephen et al.

[11] Patent Number: 4,645,853
[45] Date of Patent: Feb. 24, 1987

[54] HINDERED PHENOLIC OXAMIDE COMPOUNDS AND STABILIZED COMPOSITIONS

[75] Inventors: John F. Stephen, West Chester, Pa.; Jerry H. Smith; Makram H. Meshreki, both of Wilmington, Del.

[73] Assignee: ICI Americas Inc., Wilmington, Del.

[21] Appl. No.: 771,496

[22] Filed: Aug. 30, 1985

[51] Int. Cl.[4] .................. C07C 69/76; C08K 5/20
[52] U.S. Cl. .................................... 560/58; 524/219
[58] Field of Search .......................... 560/58; 524/219

[56] References Cited

U.S. PATENT DOCUMENTS

| | | | |
|---|---|---|---|
| 2,399,736 | 5/1946 | Holmes | 560/58 |
| 2,784,141 | 3/1957 | Jacobsen | 560/58 |
| 3,198,825 | 8/1965 | Zeile et al. | 560/58 |
| 3,529,982 | 9/1970 | Luethin | 524/219 |
| 3,626,008 | 12/1971 | Biland | 524/219 |
| 3,906,033 | 9/1975 | Biland et al. | 524/219 |
| 3,979,360 | 9/1976 | Spivack | 524/219 |
| 4,145,556 | 3/1979 | Hirsch et al. | 524/219 |
| 4,145,723 | 5/1979 | Hirsch et al. | 524/219 |
| 4,304,714 | 12/1981 | Wheeler et al. | 524/219 |

*Primary Examiner*—Paul J. Killos
*Attorney, Agent, or Firm*—Richard A. Rowe

[57] ABSTRACT

Novel hindered phenolic compounds derived from oxamides are disclosed which are useful as stabilizers of synthetic polymer resins.

15 Claims, No Drawings

HINDERED PHENOLIC OXAMIDE COMPOUNDS AND STABILIZED COMPOSITIONS

The present invention is directed to novel hydroxyphenyl oxamide esters, and to stabilized polymer resins containing these materials. It is also directed to polymer resins in contact with a heavy metal such as copper which are commonly used in wire and cable applications. It also relates to resins containing the novel stabilizer compounds with costabilizers including thio-synergists, phosphites, and other hindered phenolic compounds.

The hindered hydroxyphenyl oxamides of the invention have the following general formula:

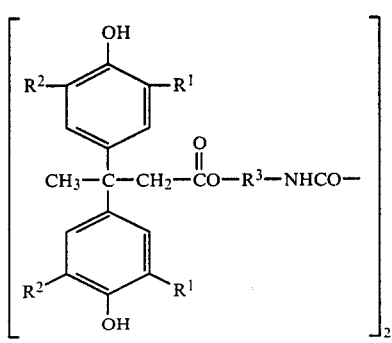

wherein $R^1$ and $R^2$ are independently H or an alkyl group having from 1 to 8 carbon atoms with the proviso that when $R^1$ is H, $R^2$ is alkyl; $R^3$ is a divalent hydrocarbon radical containing up to about 12 carbon atoms. It is preferred that the alkyl group $R^1$ or $R^2$ be selected from methyl, ethyl, secondary propyl, secondary butyl or tertiary butyl.

The compounds of the invention have been found to be useful as both primary antioxidants and as metal deactivators and are effective in wire and cable applications. U.S. Pat. Nos. 4,145,556 and 4,304,714 disclose compounds having an oxamide moiety linked to hindered phenols which are used as primary stabilizers and as metal deactivators. However, compounds of the present invention have shown superiority to these prior art compounds.

The compounds of the present invention can be prepared by any one of three distinct routes from readily available starting materials.

GENERAL PROCEDURE A

An N,N'-bis-hydroxyalkyl(or aryl)oxamide having the following general formula (HO—$R^3$—NHCO)$_2$ is reacted with a lower alkyl ester of acetoacetic acid under transesterification conditions to form an acetoacetic diester having the general formula: (CH$_3$COCH$_2$CO$_2$-$R^3$-NHCO)$_2$ according to a procedure outlined in U.S. Pat. No. 4,339,383. This material is then reacted with a substituted phenol under condensation conditions to give the compound of the invention of general formula I. Conditions for carrying out this reaction are described in O. Mauz, Ann., 23 (1974) and U.S. Pat. No. 4,022,819. Procedures for making the hydroxy alkyl (or aryl) oxamides are known and may be found in W. H. Rauscher and W. H. Clark, J. Am. Chem. Soc., 70, 438 (1948); U.S. Pat. No. 4,209,607; E. S. Lane, J. Chem. Soc., 2006 (1956): I. Butula and G. Karlovic, Ann., 1455 (1976); and I. F. Winternitz and M. Mousseron, Bull. Soc. Chim. France, 1087 (1948).

GENERAL PROCEDURE B

An N,N'-bis-hydroxyalkyl(or aryl)oxamide is reacted with a lower alkyl ester of a substituted 3,3-bis-arylbutanoic acid under transesterification conditions to give the products of the invention directly. Procedures for making lower alkyl esters of substituted 3,3-bis-arylbutanoic acids are described in O. Mauz, Ann. 23 (1974); U.S. Pat. No. 4,022,819; and DE No. 2706937. Suitable transesterification catalyst include sodium methoxide, lithium hydride, lithium amide and organo tin compounds described in U.S. Pat. No. 4,263,446.

GENERAL PROCEDURE C

An N,N'-bis-hydroxyalkyl(or aryl)oxamide is reacted with the acid chloride of a substituted 3,3-bis-arylbutanoic acid to give the compounds of the invention directly. The acid chloride is prepared by the usual methods from the corresponding acid which can be derived from the ester by the procedure described in GB No. 1,521,567.

The compounds of this invention are stabilizers of organic material normally subject to thermal and oxidative deterioration. Materials which are thus stabilized include synthetic organic polymeric substances made by the polymerization of at least one ethylenically unsaturated monomer such as vinyl resins formed from the polymerization of vinyl halides or from the co-polymerization of vinyl halides with unsaturated polymerizable compounds, for example, vinyl esters, $\alpha,\beta$-unsaturated ketones, $\alpha,\beta$-unsaturated aldehydes, and unsaturated hydrocarbons such as butadiene and syrene; poly-$\alpha$-olefins such as polyethylene, polypropylene, polybutylene and the like including co-polymers of poly-$\alpha$-olefins, polyurethanes and polyamines such as polyhexamethyleneadipamid and caprolactam; polyesters such as polyethyleneterepthalate; polycarbonates; polyacetals; polystyrenes; polyethyleneoxide; polyisoprene; polybutadiene and co-polymers such as those of high impact polystyrene containing co-polymers of butadiene and styrene and those formed by the co-polymerization of acrylonitrile, butadiene and/or styrene.

In general one or more of the stabilizers of the present invention are employed in amounts ranging from about 0.005 to about 5% by weight of the composition to be stabilized. A particularly advantageous range for the stabilizers of the present invention is from about 0.05% to about 2% by weight. The preferred range is particularly effective in polyolefins such as polypropylene.

These compounds may be incorporated in the polymer substance during the usual processing operations, for example, by milling or extrusion. The stabilized polymer can be fabricated into films, filaments, hollow spheres and the like. The heat stabilizing properties of these compounds advantageously stabilize a polymer against degradation during such processing at the high temperatures generally encountered.

The stabilizers employed in this invention can also be used in combination with other stabilizers or additives. Especially useful costabilizers are dilauryl-$\beta$-thiodipropionate and distearyl-$\beta$-thiodipropionate.

The stabilizer described in this invention can be used in combination with di- and tri-alkyl and alkylphenyl phosphites such as tris-nonylphenyl phosphite, tris(2,4-di-tert-butylphenyl)phosphite, bis(2,4-di-tert-butylphenyl) pentaerythritol diphosphite, tetrakis(2,4-di-tertbutylphenyl)-4,4'-biphenylene diphosphonite, and distearyl pentaerythritol diphosite.

Other antioxidants, antiozonants, thermal stabilizers, ultraviolet light absorbers, coloring materials, dyes, pigments, metal chelating agents, etc. may also be used in the compositions in combination with the stabilizers of the invention.

The following examples serve to illustrate but not limit the invention. All proportions expressed therein are parts by weight unless otherwise specified.

EXAMPLE 1

3,3-Bis(3,5-di-tert-butyl-4-hydroxyphenyl) butanoic acid, N,N'-bis(2-hydroxyethyl) oxamide diester 3,3-Bis(3,5-di-tert-butyl-4-hydroxyphenyl) butanoic acid (14.3 g) and oxalyl chloride (25 ml) were combined and reacted at room temperature for 2 hr. Excess oxalyl chloride was removed under vacuum. The residue was dissolved in 90 ml dimethoxyethane and combined with N,N'-bis(2-hydroxyethyl) oxamide (2.41 g). The mixture was refluxed 4 hr. then stirred overnight at room temperature. Solvent was removed under vacuum. The residue was recrystallized from ethanol/water to give 9.1 g of the desired product as a white solid, mp 173°–175° C.

Cal for: $C_{70}H_{104}N_2O_{10}$: C, 74.17; H, 9.25; N, 2.47. Found: C, 73.95; H, 9.02; N, 2.33.

EXAMPLE 2

3,3-Bis(3-tert-butyl-4-hydroxyphenyl) butanoic acid, N,N'-bis(2-hydroxyethyl) oxamide diester Acetoacetic acid, N,N'-bis(2-hydroxyethyl) oxamide diester (86 g), 2-tert-butyl phenol (300 g), and 1-dodecanethiol (38.6 g) were combined in a flask equipped with a mechanical stirrer, condenser, thermometer, and gas sparge. The reaction mixture was cooled to 10° C., with stirring, while HCl gas was bubbled in over a period of 7 hrs. The mixture was allowed to react at room temperature overnight. Excess 2-tert-butyl phenol was removed by vacuum distillation and the residue was crystallized from toluene/ethanol to give 122 g of the desired product, mp 216°–218° C.

Cal. for: $C_{54}H_{72}N_2O_{10}$: C, 71.36; H, 7.92; N, 3.08. Found: C, 71.50; H, 8.06; N, 3.51.

EXAMPLE 3

3,3-Bis(3,5-di-tert-butyl-4-hydroxyphenyl) butanoic acid, N,N'-bis(3-hydroxypropyl) oxamide diester In a manner similar to Example 1, N,N'-bis(2-hydroxyethyl)oxamide was replaced with N,N'-bis(3-hydroxypropyl)oxamide to give the desired product which was crystallized from 95% ethanol, mp 150°–152° C.

Cal. for: $C_{72}H_{108}N_2O_{10}$: C, 74.48; H, 9.31; N, 2.41. Found: C, 74.30; H, 9.41; N, 2.27.

EXAMPLE 4

3,3-Bis(3-tert-butyl-4-hydroxyphenyl) butanoic acid, N,N'-bis(3-hydroxypropyl) oxamide diester.

a. Ethyl acetoacetate (26 g) and N,N'-bis(3-hydroxypropyl) oxamide (10.2 g) were combined and heated to 150° C. for 6.5 hrs. Excess ethyl acetoacetate was removed by vacuum distillation and the residue was crystallized from abs. ethanol to give 16.9 g of acetoacetic acid, N,N'-bis(3-hydroxypropyl) oxamide diester, mp 80.5°–82.0° C.

b. In a manner similar to example 2, acetoacetic acid, N,N'-bis(2-hydroxyethyl) oxamide diester was replaced with acetoacetic acid, N,N'-bis(3-hydroxypropyl) oxamide diester (prepared above) to give the desired product which was purified by dry column chromatography, mp 123°–127° C.

Cal. for: $C_{56}H_{76}N_2O_{10}$: C, 71.77; H, 8.17; N, 2.99. Found: C, 71.34; H, 8.15; N, 2.93.

EXAMPLE 5

3,3-Bis(3,5-di-tert-butyl-4-hydroxyphenyl) butanoic acid, N,N'-bis(1,1-dimethyl-2-hydroxyethyl) oxamide diester In a manner similar to example 1, N'N-bis(2-hydroxyethyl) oxamide was replaced with N,N'-bis(1,1-dimethyl-2-hydroxyethyl) oxamide to give the desired product, mp 247°–249° C.

Cal. for: $C_{74}H_{112}N_2O_{10}$: C, 74.71; H, 9.49; N, 2.35. Found: C, 74.64; H, 9.32; N, 2.17.

EXAMPLE 6

3,3-Bis(3-tert-butyl-4-hydroxyphenyl) butanoic acid, N,N'-bis(1,1-dimethyl-2-hydroxyethyl) oxamide diester a. In a manner similar to example 4, part a., N,N'-bis(3-hydroxypropyl) oxamide was replaced with N,N'-bis(1,1-dimethyl-2-hydroxyethyl) oxamide to give acetoacetic acid, N,N'-bis(1,1-dimethyl-2-hydroxyethyl) oxamide diester, mp 93°–95° C.

Cal. for: $C_{18}H_{28}N_2O_8$: C, 53.99; H, 7.05; N, 7.00. Found: C, 53.82; H, 7.09; N, 6.85.

b. In a manner similar to example 2, acetoacetic acid, N,N'-bis(2-hydroxyethyl) oxamide diester was replaced with acetoacetic acid, N,N'-bis(1,1-di-methyl-2-hydroxyethyl) oxamide diester (prepared above) to give the desired product which was purified by dry column chromatography, mp 130°–135° C.

Cal. for: $C_{58}H_{80}N_2O_{10}$: C, 72.17; H, 8.35; N, 2.90. Found: C, 71.86; H, 8.32; N, 2.67.

EXAMPLE 7

3,3-Bis(3,5-di-tert-butyl-4-hydroxyphenyl) butanoic acid, N,N'-bis(5-hydroxypentyl) oxamide diester In a manner similar to example 1, N,N'-bis(2-hydroxyethyl) oxamide was replaced with N,N'-bis(5-hydroxypentyl) oxamide to give the desired product which was purified by column chromatography, mp 84°–87° C.

Cal. for: $C_{76}H_{116}N_2O_{10}$: C, 74.96; H, 9.60; N, 2.30. Found: C, 74.90; H, 9.55; N, 2.00.

EXAMPLE 8

3,3-Bis(3,5-di-tert-butyl-4-hydroxyphenyl) butanoic acid, N,N'-bis(2-methyl-2-hydroxyethyl) oxamide diester In a manner similar to example 1, N,N'-bis (2-hydroxyethyl) oxamide was replaced with N,N'-bis (2-methyl-2-hydroxyethyl) oxamide to give the desired product which was purified by column chromatography, mp 116°–118° C.

Cal. for: $C_{72}H_{108}N_2O_{10}$: C, 74.44; H, 9.37; N, 2.41. Found: C, 74.44; H, 9.41; N, 2.09.

EXAMPLE 9

3,3-Bis(3,5-di-tert-butyl-4-hydroxyphenyl) butanoic acid, N,N'-bis(2-hydroxyphenyl) oxamide diester.

In a manner similar to example 1, N,N'-bis(2-hydroxyethyl) oxamide was replaced with N,N'-bis(2-hydroxyphenyl) oxamide to give the desired product which was crystallized from 95% ethanol, mp 216°–218° C.

Cal. for: $C_{78}H_{104}N_2O_{10}$: C, 76.22; H, 8.46; N, 2.28. Found: C, 76.12; H, 8.63; N, 1.99.

EXAMPLE 10

This example shows the usefulness of the invention for the stabilization of polypropylene. The stabilizers were incorporated into Profax 6301 TM polypropylene resin by solvent blending (methylene chloride) followed by extrusion at 200° C. Twenty-five mil plaques were prepared by compression molding at 6,000 psi and 188° C. Samples were tested in a forced draft oven at 150° C. Failure was determined when the first signs of decomposition were observed. Tests were run in quadruplicate and an average value was determined. Results are shown in Table I.

TABLE I

| Stabilizer | Concentration (%) | Hours to Failure |
| --- | --- | --- |
| none | — | 24 |
| Ex. 1 | 0.10 | 96 |
| Ex. 2 | 0.10 | 24 |
| Ex. 3 | 0.10 | 168 |
| Ex. 4 | 0.10 | 72 |
| Ex. 5 | 0.10 | 24 |
| Ex. 6 | 0.10 | 60 |
| Ex. 9 | 0.10 | 72 |
| Ex. 1/DSTDP* | 0.10/0.25 | 1848 |
| Ex. 2/DSTDP | 0.10/0.25 | 1016 |
| Ex. 3/DSTDP | 0.10/0.25 | 1848 |
| Ex. 4/DSTDP | 0.10/0.25 | 1200 |
| Ex. 5/DSTDP | 0.10/0.25 | 1380 |
| Ex. 6/DSTDP | 0.10/0.25 | 1584 |
| Ex. 7/DSTDP | 0.10/0.25 | 1248 |
| Ex. 8/DSTDP | 0.10/0.25 | 1416 |
| Ex. 9/DSTDP | 0.10/0.25 | 1576 |

*distearyl-$\beta$-thiodipropionate

EXAMPLE 11

This example shows the usefulness of the invention for stabilization of high impact polystyrene. The stabilizers were incorporated into high impact polystyrene by milling at 188° C. Twenty mil plaques were prepared by compression molding at 6,000 psi and 188° C. Samples were tested in a forced draft oven at 90° C. Failure was determined when cracking was observed after flexing the plaque over a one-inch mandrel. Tests were run in quadruplicate and an average value was determined. Results are shown in Table II.

TABLE II

| Stabilizer | Concentration (%) | Hours to Failure |
| --- | --- | --- |
| none | — | 48 |
| Ex. 1 | 0.10 | 336 |
| Ex. 2 | 0.10 | 72 |
| Ex. 3 | 0.10 | 192 |
| Ex. 4 | 0.10 | 264 |
| Ex. 5 | 0.10 | 208 |
| Ex. 6 | 0.10 | 186 |
| Ex. 7 | 0.10 | 304 |
| Ex. 8 | 0.10 | 304 |
| Ex. 9 | 0.10 | 336 |
| Ex. 1/DLTDP* | 0.05/0.15 | 246 |
| Ex. 2/DLTDP | 0.05/0.15 | 72 |
| Ex. 3/DLTDP | 0.05/0.15 | 280 |
| Ex. 5/DLTDP | 0.05/0.15 | 152 |
| Ex. 7/DLTDP | 0.05/0.15 | 272 |
| Ex. 8/DLTDP | 0.05/0.15 | 352 |
| Ex. 9/DLTDP | 0.05/0.15 | 216 |

*dilauryl-$\beta$-thiodipropionate

EXAMPLE 12

This example shows the usefulness of the invention as a metal deactivator in polypropyene. The stabilizers were incorporated into Profax 6301 TM polypropylene resin by solvent blending (methylene chloride) followed by extrusion at 200° C. Thirty mil plaques containing copper gauze screens were prepared by compression molding at 6,000 psi and 188° C. Samples were tested in forced draft oven at 150° C. Failure was determined when the first signs of decomposition were observed. Tests were run in quadruplicate and an average value was determined. Results are shown in Table III.

TABLE III

| Stabilizer | Concentration (%) | Hours to Failure |
| --- | --- | --- |
| none | — | 24 |
| Ex. 1 | 0.20 | 144 |
| Ex. 2 | 0.20 | 48 |
| Ex. 3 | 0.20 | 208 |
| Irganox TM 1010*/Ex. 1 | 0.10/0.10 | 1016 |
| Irganox TM 1010/Ex. 2 | 0.10/0.10 | 680 |
| Irganox TM 1010/Ex. 3 | 0.10/0.10 | 594 |
| Irganox TM 1010/Ex. 5 | 0.10/0.10 | 774 |
| Irganox TM 1010/Ex. 6 | 0.10/0.10 | 486 |
| Irganox TM 1010/Ex. 7 | 0.10/0.10 | 440 |
| Irganox TM 1010/Ex. 8 | 0.10/0.10 | 672 |
| Irganox TM 1010/Ex. 9 | 0.10/0.10 | 720 |

*Commercially available costabilizer

EXAMPLE 13

This example shows the usefulness of the invention as a metal deactivator in high density polyethylene. The stabilizers were incorporated into high density polyethylene (Allied Chemical EA 55-003) by solvent blending (methylene chloride) followed by extrusion at 230° C. Thirty mil plaques containing copper gauze screens were prepared by compression molding at 6,000 psi and 188° C. Samples were tested in a forced draft oven at 120° C. Failure was determined when yellow discoloration and degradation of the polymer were observed. Tests were run in quadruplicate and an average value was determined. Results are shown in Table IV.

TABLE IV

| Stabilizer | Concentration (%) | Hours to Failure |
| --- | --- | --- |
| none | — | 144 |
| Ex. 1 | 0.20 | 2816 |
| Ex. 2 | 0.20 | 664 |
| Ex. 3 | 0.20 | 1728 |
| Irganox TM 1010/Ex. 1 | 0.10/0.10 | 5184 |
| Irganox TM 1010/Ex. 2 | 0.10/0.10 | 5208 |
| Irganox TM 1010/Ex. 3 | 0.10/0.10 | 4968 |
| Irganox TM 1010/Ex. 5 | 0.10/0.10 | 5344 |
| Irganox TM 1010/Ex. 7 | 0.10/0.10 | 5168 |
| Irganox TM 1010/Ex. 8 | 0.10/0.10 | 5960 |

EXAMPLE 14

This example shows the usefulness of the invention as a metal deactivator in low density polyethylene. The stabilizers were incorporated into low density polyethylene (Northern Petrochemicals NPE-191) using a two-roll mill. Thirty mil plaques containing copper gauze screens were prepared by compression molding at 6,000 psi and 188° C. Samples were tested in a forced draft oven at 120° C. Failure was determined when yellow discoloration and degradation of the polymer were observed. Tests were run in quadruplicate and an average value was determined. Results were shown in Table V.

TABLE V

| Stabilizer | Concentration (%) | Hours to Failure |
| --- | --- | --- |
| none | — | 72 |
| Irganox ™ 1010/Ex. 1 | 0.10/0.10 | 4242 |
| Irganox ™ 1010/Ex. 2 | 0.10/0.10 | 3560 |
| Irganox ™ 1010/Ex. 3 | 0.10/0.10 | 4230 |
| Irganox ™ 1010/Ex. 5 | 0.10/0.10 | 3792 |
| Irganox ™ 1010/Ex. 6 | 0.10/0.10 | 3564 |
| Irganox ™ 1010/Ex. 7 | 0.10/0.10 | 2784 |
| Irganox ™ 1010/Ex. 8 | 0.10/0.10 | 4338 |
| Irganox ™ 1010/Ex. 9 | 0.10/0.10 | 4554 |

What is claimed is:

1. A hindered phenolic compound derived from an oxamide and having the general formula:

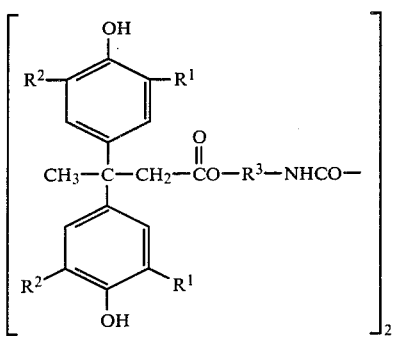

wherein $R^1$ and $R^2$ are independently H or an alkyl group of from 1–8 carbon atoms with the proviso that when $R^1$ is H, $R^2$ is alkyl, and $R^3$ is a divalent hydrocarbon radical containing from 1–12 carbon atoms.

2. A compound of claim 1 wherein $R^1$ and $R^2$ are selected from the group consisting of methyl, ethyl, isopropyl, sec-butyl and tert-butyl.

3. A compound of claim 2 wherein $R^3$ is an alkylene radical having 2–5 carbon atoms.

4. A compound of claim 2 which is 3,3-bis(3,5-di-tert-butyl-4-hydroxyphenyl) butanoic acid, N,N'-bis(2-hydroxyethyl) oxamide diester.

5. A compound of claim 2 which is 3,3-bis(3,5-di-tert-butyl-4-hydroxyphenyl) butanoic acid, N,N'-bis(3-hydroxypropyl) oxamide diester.

6. A compound of claim 2 which is 3,3-bis(3,5-di-tert-butyl-4-hydroxyphenyl) butanoic acid, N,N'-bis(1,1-dimethyl-2-hydroxyethyl) oxamide diester.

7. A compound of claim 2 which is 3,3-bis(3,5-di-tert-butyl-4-hydroxyphenyl) butanoic acid, N,N'-bis(5-hydroxypentyl) oxamide diester.

8. A compound of claim 2 which is 3,3-bis(3,5-di-tert-butyl-4-hydroxyphenyl) butanoic acid, N,N'-bis(2-methyl-2-hydroxyethyl) oxamide diester.

9. A compound of claim 2 which is 3,3-bis(3,5-di-tert-butyl-4-hydroxyphenyl) butanoic acid, N,N'-bis(2-hydroxyphenyl) oxamide diester.

10. A composition comprising a polymerized ethylenically unsaturated monomer and 0.005–5% by weight of a compound of claim 1.

11. A composition of claim 10 comprising a resin selected from the group consisting of polyethylene, polypropylene and polystyrene.

12. A composition of claim 10 comprising a resin in contact with a heavy metal.

13. A composition of claim 12 in which the metal is copper.

14. A composition of claim 10 further comprising a co-stabilizer compound selected from the group consisting of dilauryl-β-thiodipropionate, distearyl-β-thiodipropionate, distearyl pentaerythritol diphosphite, pentaerythritol tetrakis(3-(dodecylthio) propionate), tris(2,4-di-tert-butylphenyl)phosphite, bis(2,4-di-tert-butylphenyl)pentaerythritol diphosphite, and tetrakis(2,4-di-tert-butylphenyl)-4, 4'-biphenylene diphosphonite.

15. A composition of claim 12 further comprising a hindered phenolic co-stabilizer.

* * * * *